(12) United States Patent
Tanikawa

(10) Patent No.: US 6,817,962 B2
(45) Date of Patent: Nov. 16, 2004

(54) PLANETARY GEAR MECHANISM

(75) Inventor: Naoya Tanikawa, Nagoya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/374,064

(22) Filed: Feb. 27, 2003

(65) Prior Publication Data

US 2003/0186771 A1 Oct. 2, 2003

(30) Foreign Application Priority Data

Feb. 27, 2002 (JP) .................................... 2002-051227

(51) Int. Cl.[7] ............................................ F16H 54/04
(52) U.S. Cl. ..................................................... 475/159
(58) Field of Search ......................................... 475/159

(56) References Cited

U.S. PATENT DOCUMENTS 5,480,362 A    1/1996  Tanaka et al.
5,928,100 A *  7/1999  Ohtake et al. .............. 475/159

FOREIGN PATENT DOCUMENTS

| JP | 5-248499 A | 9/1993 |
|----|------------|--------|
| JP | 6-58381 A  | 3/1994 |
| JP | 9-303495 A | 11/1997 |

* cited by examiner

Primary Examiner—Dirk Wright
(74) Attorney, Agent, or Firm—Burns, Doane, Swecker & Mathis, L.L.P.

(57) ABSTRACT

A planetary gear mechanism which includes a sun gear having an introduction passage and a communication passage for communicating the introduction passage and an outside of the sun gear, a ring gear, a plurality of pinion gears geared with the sun gear and the ring gear, a plurality of pinion pins rotatable relative to the pinion gears, a carrier having a penetration bore inserted with the pinion pin for supporting the pinion pins so that the pinion gears rotate about the sun gear, a washer provided between the pinion gear and the carrier being inserted with the pinion pin, a slit formed on the carrier formed radially inward relative to the penetration bore, the slit being formed facing the washer, a restriction portion formed on the washer, and an extension portion formed on the washer and extended radially inward relative to a tooth flank of the pinion gear.

19 Claims, 2 Drawing Sheets

PLANETARY GEAR MECHANISM

This application is based on and claims priority under 35 U.S.C. §119 with respect to Japanese Patent Application No. 2002-051227 filed on Feb. 27, 2002, the entire content of which is incorporated herein by reference.

FIELD OF THE INVENTION

The present invention relates to a planetary gear mechanism. More particularly, the present invention pertains to a construction for a lubrication of a planetary gear mechanism.

BACKGROUND OF THE INVENTION

Known planetary gear mechanisms applied to automatic transmissions and center differential gears include a sun gear, a ring gear, a plurality of pinion gears geared between the sun gear and the ring gear, and a carrier for supporting the pinion gears. An external peripheral surface of each pinion gear is formed with a gear engaged with a tooth flank of the sun gear and the ring gear. A pinion pin is rotatably inserted into an internal periphery of each pinion gear via a rolling bearing. By fixing an axial end portion of the pinion pin to the carrier, the pinion gears are supported by the carrier.

The known planetary gear mechanisms of the foregoing construction includes a radial slit provided on the carrier and a bore provided in the pinion pin so that the slit and the bore are in communication each other. With this construction, when the centrifugal force affects, the lubrication oil in the sun gear is introduced into between the pinion pin and the pinion gear and into geared portions between the pinion gear, the sun gear, and the ring gear so that the lubrication of the planetary gear mechanism is performed.

Notwithstanding, with the foregoing known construction, washers provided between the pinion gear and the carrier are rotated about the pinion pin. This may cause the burning and the damage between the washers and the carrier or between the washers and the pinion gears.

A need thus exists for a planetary gear mechanism which securely performs the lubrication performance thereof.

SUMMARY OF THE INVENTION

In light of the foregoing, the present invention provides a planetary gear mechanism which includes a sun gear having an introduction passage for introducing a lubrication fluid in an axial direction and a communication passage for communicating the introduction passage and an outside of the sun gear, a ring gear provided coaxial to the sun gear, a plurality of pinion gears geared with the sun gear and the ring gear, a plurality of pinion pins provided in an internal peripheral side of the pinion gears to be coaxial to and rotatable relative to the pinion gears, a carrier having a penetration bore inserted with an axial end of the pinion pin for supporting the pinion pins so that the pinion gears rotate about the sun gear, a washer provided between the pinion gear and the carrier being inserted with the pinion pin, a slit formed on the carrier formed radially inward relative to the penetration bore, the slit being formed facing the washer on an identical plane surface with the communication passage corresponding to a surface perpendicular to the axial direction, a restriction portion formed on the washer for restricting rotational movement of the washer relative to the carrier, and an extension portion formed on the washer and extended in radially inward direction relative to the penetration bore and radially inward relative to a tooth flank of the pinion gear.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
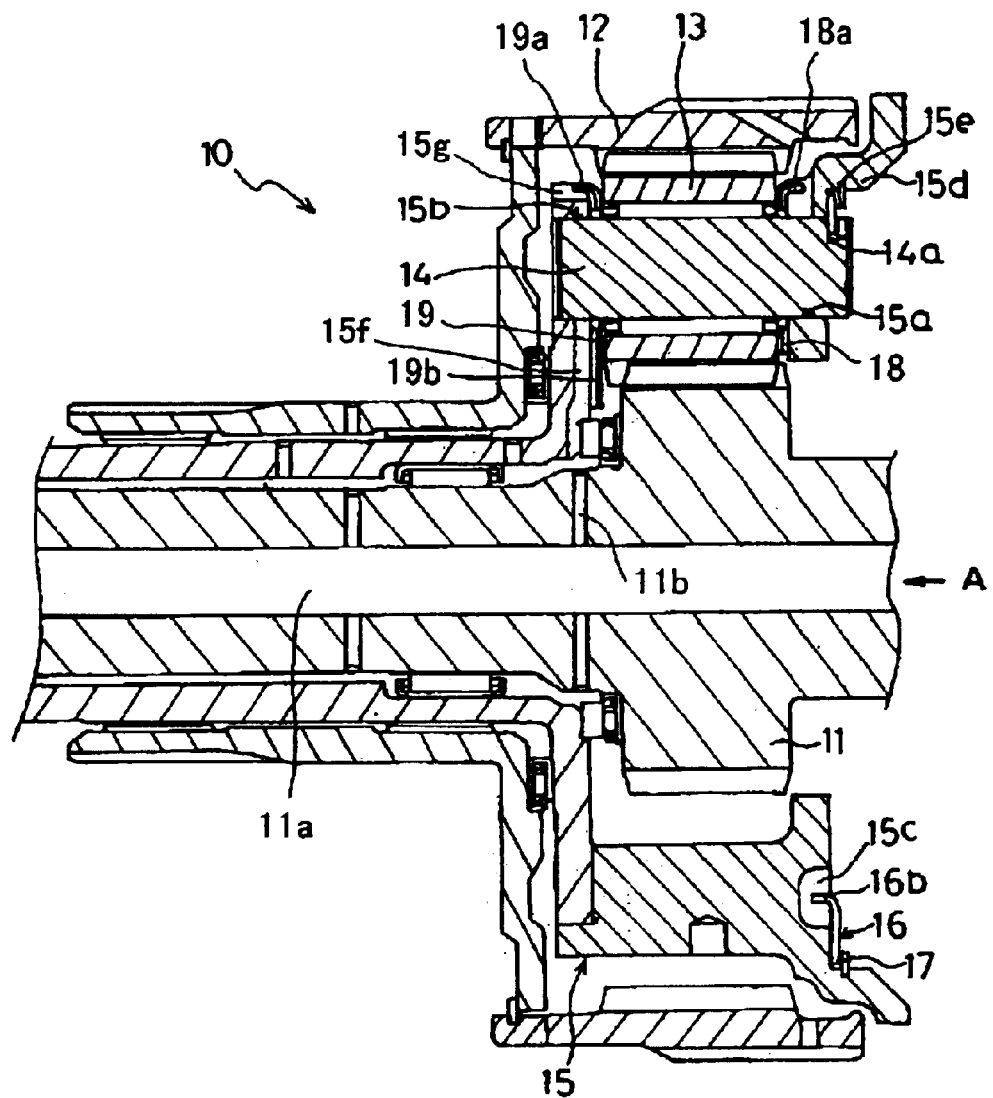
FIG. 1 is a longitudinal cross sectional view of a planetary gear mechanism according to an embodiment of the present invention.
Figure 2:
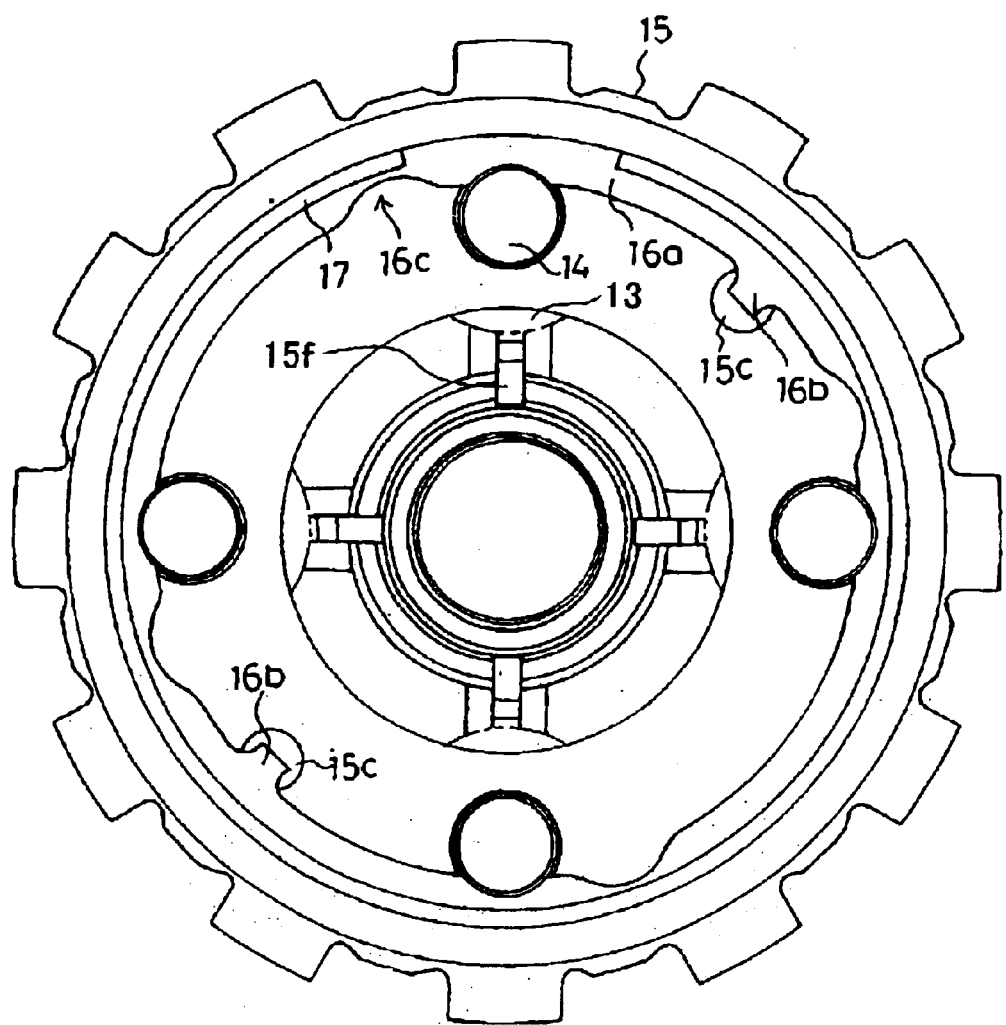
FIG. 2 is a view viewed from A of FIG. 1 before assembling a sun gear.

One embodiment of a planetary gear mechanism of the present invention will be explained with reference to the illustrations and the drawing figures. With the embodiment of the present invention, the planetary gear mechanism is applied to an automatic transmission.

A planetary gear mechanism 10 includes a sun gear 11 having an introduction passage 11a for introducing a lubrication oil in an axial direction and a communication passage 11b for communicating between the introduction passage 11a and outside thereof, a ring gear 12 provided coaxial to the sun gear 11, four pinion gears 13, four pinion pins 14 provided in an internal peripheral side of the respective pinion gear 13, a carrier 15 for unitary supporting the pinion pins 14 so that the pinion gears 13 rotate about the sun gear 11, a plate member 16 provided on the carrier 15 washers 18, 19 provided between the pinion gear 13 and the carrier 15 respectively while being inserted with the pinion pin 14.

The sun gear 11, the ring gear 12, and the carrier 15 are connected to an input shaft of the automatic transmission, a case of the automatic transmission, an output shaft of the automatic transmission, or other elements of the planetary gear mechanism (not shown) via different frictional engagement elements respectively. The engagement and disengagement of the frictional engaging elements are switched when shifting the automatic transmission to switch the input-output relations relative to the sun gear 11, the ring gear 12, and the carrier 15.

Each pinion gear 13 is formed with a tooth flank on an external peripheral surface thereof to be geared with the sun gear 11 and the ring gear 12. Each pinion pin 14 is provided in an internal peripheral side of the pinion gear 13 via a bearing to be coaxial to and rotatable relative to the pinion gear 13. Four penetration bores 15a and four penetration bores 15b for inserting axial end portions of the four pinion pins 14 are formed on the carrier 15.

The pinion pin 14 and the carrier, 15 are fixed in the following manner. A slit 14a perpendicular to the axial direction of the pinion pin 14 is formed on an axial end portion of the pinion pin 14 projecting from the penetration bore 15a of the carrier 15 along a surface of the plate member 16. Recess portions 15c recessed in the axial direction are formed on two portions of the carrier 15 where the pinion pins 14 are not assembled. The plate member 16 is configured to be a ring shape which includes fitting portions 16a being fitted into the slits 14a and projecting portions 16b projecting into the recess portions 15c. The carrier 15 includes a cylindrical portion 15d formed with a peripheral groove 15e. By fitting the fitting portions 16a into the slits 14a, the projecting portions 16b are fit into the recess portions 15c. Then, by fitting a C-ring 17 into the peripheral groove 15e, the pinion pins 14 are fixed to the carrier 15 in the rotational direction and in the axial direction. Recess portions 16c are formed between adjacent projecting portions 16b on the plate member 16.

The washers 18, 19 made from metal pieces are provided between the pinion gear 13 and the carrier 15 while being inserted with the pinion pin 14. The washers 18, 19 have restriction portions 18a, 19a for restricting the movement of the washers 18, 19 in the rotational direction relative to the carrier 15 and the pinion pin 14. The restriction portions 18a, 19a are formed by bending one end of the washers 18, 19 in the axial direction so that the restriction portions 18a, 19a are fitted into a groove 15g formed on an external peripheral portion of the carrier 15 in the axial direction. The washer 19 provided on the penetration bore 15b side is formed with an extension portion 19b unitary with the restriction portion 19a extended in radially inward direction. The extension portion 19b is provided further inward compared to the tooth flank of the pinion gear 13 relative to the penetration bore 15b. The washer 18 provided on the penetration bore 15a side is not formed with the extension portion so that the washer 18 does not interfere with the tooth flank of the sun gear 11.

The carrier 15 includes slits 15f formed from the respective penetration bores 15b in the radially inward direction on a surface side facing the washer 19c. A plurality of slits 15f are radially and inwardly formed on the carrier 15 within a diameter range of the carrier 15 that are relative to the penetration bore 15b so that the slits 15f do not overlap the penetration bore 15b. The slits 15f are formed on the same plane surface with the communication passage 11b which corresponds to the perpendicular surface relative to the axial direction of the carrier 15.

Accordingly, because the movement of the washers 18, 19 in the rotational direction is restricted by the restriction portions 18a, 19a, the washers 18, 19 are approximately fixed to the carrier 15 in the rotational direction. Thus, the washers 18, 19 are not rotated about the pinion pin 14 after assembling the washers 18, 19 to the planetary gear mechanism 10. Further, because the extension portion 19b of the washer 19 is formed extended in the radially inward direction relative to the penetration bore 15b, the slits 15f are covered with the extension portions 19b on the carrier 15 on the surface of the carrier 15 facing the washer 19. Accordingly, the lubrication oil discharged from the communication passage 11b via the introduction passage 11a by the centrifugal force at the rotation of the sun gear 11 is easily and accurately introduced into the slits 15f with the extended portion 19b.

As explained above, the washers 18, 19 do not rotate about the pinion pin 14 to restrain the burning and the damage between the carrier 15 and the washers 18, 19 or between the washers 18, 19 and the pinion gear 13. Further, because the sufficient lubrication oil is introduced into the slits 15f with the extension portion 19b, the lubrication in the planetary gear mechanism 10 can be secured performed.

The present invention is not limited to the foregoing embodiment and the planetary gear mechanism of the present invention may be applied to a center differential for the four wheel drive vehicle.

According to the embodiment of the present invention, the rotational movement of the washers provided between the carrier and the pinion gear is restricted by the restriction portions of the washers. The washers do not rotate about the pinion pin because the washers are approximately fixed to the carrier in the rotational direction after assembling the washers to the planetary gear mechanism. In addition, because the rotational movement of the washer is restricted, the rotational movement of the extension portion provided unitary with the restriction portion of the washer is also restricted. The extension portion of the washer covers the slit formed on the carrier radially inward relative to the penetration bore. Thus, with providing the extension portion for covering the slit, the lubrication oil discharged from the communication passage is likely to be introduced into the slit via the introduction passage by the centrifugal force at the rotation of the sun gear. Accordingly, the washers do not rotate relative to the pinion pin and the sufficient lubrication oil is supplied to the slit with the extension portion of the washer to securely perform the lubrication of the planetary gear mechanism.

According to the embodiment of the present invention, the restriction portions of the washers are formed by bending the portion of the washer in the axial direction of the carrier so that the restriction portions are fitted into the axial groove formed on the external peripheral portion of the carrier. Accordingly, the washers can be fixed to the carrier and the pinion pins to restrict the rotation with relatively simple construction.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A planetary gear mechanism comprising:
    a sun gear having an introduction passage for introducing a lubrication fluid in an axial direction and a communication passage for communicating the introduction passage and an outside of the sun gear;
    a ring gear provided coaxial to the sun gear;
    a plurality of pinion gears geared with the sun gear and the ring gear;
    a plurality of pinion pins provided in an internal peripheral side of the pinion gears to be coaxial to and rotatable relative to the pinion gears;
    a carrier having a plurality of penetration bores each inserted with an axial end of one of the pinion pins for supporting the pinion pins so that the pinion gears rotate about the sun gear;
    a washer provided between the pinion gear and the carrier being inserted with the pinion pin;
    a slit formed on the carrier radially inward relative to the penetration bore, the slit being formed facing the washer on an identical plane surface with the communication passage corresponding to a surface perpendicular to the axial direction;
    a restriction portion formed on the washer for restricting rotational movement of the washer relative to the carrier; and
    an extension portion formed on the washer and extended in a radially inward direction relative to the penetration bore and radially inward relative to a tooth flank of the pinion gears.

2. A planetary gear mechanism according to claim 1, wherein the restriction portion of the washer is formed by bending one end of the washer in an axial direction to be fitted into a groove formed on an external peripheral portion of the carrier.

3. A planetary gear mechanism according to claim 1, wherein the washer is extending over the slit and defining hollow portion therebetween.

4. A planetary gear mechanism according to claim 1, wherein the carrier comprises a plurality of slits equal in number to the number of pinion gears.

5. A planetary gear mechanism according to claim 1, wherein an opening of the introduction passage is positioned adjacent to the opening of the slit.

6. A planetary gear mechanism comprising:
a sun gear having an introduction passage for introducing a lubrication fluid in
an axial direction and a communication passage for communicating the introduction passage and an outside of the sun gear;
a ring gear provided coaxial to the sun gear;
a plurality of pinion gears geared with the sun gear and the ring gear;
a plurality of pinion pins provided in an internal peripheral side of the pinion gears to be coaxial to and rotatable relative to the pinion gears;
a carrier having a plurality of penetration bores each inserted with an axial end of one of the pinion pins for supporting the pinion pins so that the pinion gears rotate about the sun gear;
a slit formed on the carrier radially inward relative to the penetration bores; and
a washer provided on one of the pinion pins between the carrier and the pinion gear that is inserted on the one pinion pin, the washer facing the slit and comprising an extension portion extending radially inwardly a distance such that a part of the extension portion faces at least a portion of a tooth flank of the pinion gear that is inserted on the one pinion pin.

7. A planetary gear mechanism according to claim 6, wherein the carrier is provided with a plurality of slits equal in number to the number of pinion gears.

8. A planetary gear mechanism according to claim 6, wherein the introduction passage possesses an opening positioned adjacent an opening of the slit.

9. A planetary gear mechanism comprising:
a sun gear having a passage to introduce a lubrication fluid, the passage communicating with outside the sun gear to direct the lubrication fluid to outside the sun gear;
a ring gear coaxial to the sun gear;
a carrier having a plurality of penetration bores;
a plurality of pinion pins each supported in one of the penetration bores of the carrier;
a plurality of pinion gears each coaxially mounted on a respective one of the pinion pins to permit relative rotation between the pinion gears and the respective pinion pins; each of the pinion gears being geared with both the sun gear and the ring gear;
a washer mounted on one of the pinion pins, the washer being positioned between the carrier and the pinion gear which is mounted on the one pinion pin; and
the washer and the carrier each including portions that engage one another to restrict rotational movement of the washer relative to both the carrier and the one pinion pin.

10. A planetary gear mechanism according to claim 9, wherein the carrier is provided with a slit which faces the washer.

11. A planetary gear mechanism according to claim 9, wherein the washer is provided with an extension portion extending radially inwardly a distance such that a part of the extension portion faces at least a portion of a tooth flank of the pinion gear that is mounted on the one pinion pin.

12. A planetary gear mechanism according to claim 9, wherein the portions of the washer and the carrier that engage one another comprise a restriction portion formed on the washer that is positioned in a groove formed in the carrier.

13. A planetary gear mechanism according to claim 12, wherein the restriction portion formed on the washer is a bent end portion of the washer.

14. A planetary gear mechanism according to claim 12, wherein the washer is a first washer positioned adjacent one end of the one pinion pin, and further comprising a second washer mounted on the one pinion pin adjacent an opposite end of the pinion pin, the second washer being positioned between the carrier and the pinion gear which is mounted on the one pinion pin, the second washer comprising a restriction portion which engages a groove in the carrier to restriction rotation of the washer relative to both the carrier and the one pinion pin.

15. A planetary gear mechanism comprising:
a sun gear having a passage to introduce a lubrication fluid, the passage communicating with outside the sun gear to direct the lubrication fluid to outside the sun gear;
a ring gear coaxial to the sun gear;
a carrier having a plurality of penetration bores;
a plurality of pinion pins each supported in one of the penetration bores of the carrier;
a plurality of pinion gears each coaxially mounted on a respective one of the pinion pins to permit relative rotation between the pinion gears and the respective pinion pins; each of the pinion gears being geared with both the sun gear and the ring gear;
a washer mounted on one of the pinion pins, the washer being positioned between the carrier and the pinion gear which is mounted on the one pinion pin;
a slit formed on the carrier radially inward relative to the penetration bores, the slit facing the washer; and
the slit having a depth which varies along a length of the slit.

16. A planetary gear mechanism according to claim 15, wherein a portion of the slit radially farther from the penetration bores has a greater depth than a portion of the slit located radially closer to the penetration bores.

17. A planetary gear mechanism according to claim 15, wherein the carrier is provided with an extension portion extending radially inwardly a distance such that a part of the extension portion faces at least a portion of a tooth flank of the pinion gear which is mounted on the one pinion pin.

18. A planetary gear mechanism according to claim 15, wherein the washer comprises a restriction portion that is positioned in a groove formed in the carrier to restrict rotation of the washer relative to both the carrier and the one pinion pin.

19. A planetary gear mechanism according to claim 18, wherein the restriction portion formed on the washer is a bent end portion of the washer.

* * * * *